(12) United States Patent
Crites

(10) Patent No.: US 7,529,694 B2
(45) Date of Patent: May 5, 2009

(54) METHOD FOR INCREASING SALES OF VEHICLES AT AN AUTOMOBILE DEALERSHIP USING A HAND HELD SCANNER AND A DATA BASE LINK

(76) Inventor: Michael Emerson Crites, 6353 Greenback Dr., Mechanicsville, VA (US) 23111

( * ) Notice: Subject to any disclaimer, the term of this patent is extended or adjusted under 35 U.S.C. 154(b) by 338 days.

(21) Appl. No.: 11/094,663

(22) Filed: Mar. 31, 2005

(65) Prior Publication Data

US 2006/0229981 A1 Oct. 12, 2006

(51) Int. Cl.
*G06F 17/30* (2006.01)
(52) U.S. Cl. .......................................... 705/27; 705/26
(58) Field of Classification Search .............. 705/26–27
See application file for complete search history.

(56) References Cited

U.S. PATENT DOCUMENTS

| | | | | |
|---|---|---|---|---|
| 2001/0049653 | A1* | 12/2001 | Sheets | 705/38 |
| 2005/0086070 | A1* | 4/2005 | Engelman | 705/1 |
| 2005/0086157 | A1* | 4/2005 | Robeljo et al. | 705/38 |

OTHER PUBLICATIONS

Koller, Mike; "Wireless Service Aids Car Buyers . . . ," InternetWeek, Jul. 9, 2001, i868p. 15, Proquest #75157778, 3pgs.*

* cited by examiner

*Primary Examiner*—Robert M. Pond

(57) ABSTRACT

This invention allows a customer to use a handheld PDA device to recognize the vehicle identification number of a vehicle for sale at a dealership's lot. The PDA then transmits over a wireless local area network the chosen vehicle identification number to a host computer server which accesses hosted database tables containing the vehicle sales price information, normal financing rate and term information, the manufacturer's incentives applicable to that vehicle including cash rebates and low APR offers, and the personal customer information necessary for calculating that customer's monthly payment estimate. Several different methods of calculation as necessary are performed, and the preferred estimate amount, typically the lowest payment estimate, is transmitted back to the PDA for display to the customer. In the event of a net cash sale, the net price after all applicable rebates, coupons, discounts, and incentives is transmitted to the PDA rather than a payment estimate.

33 Claims, No Drawings

METHOD FOR INCREASING SALES OF VEHICLES AT AN AUTOMOBILE DEALERSHIP USING A HAND HELD SCANNER AND A DATA BASE LINK

This computer program is designed to run on most any personal computer which can translate and run PHP code, including Windows XP professional with SP2 or Linux operating systems.

```
drwx------+ 4    0 Mar 30 18:19 .
drwx------+ 3    0 Mar 30 18:13 ./client
-rwx------ 1 388608 Jan 25 12:54 ./client/Setup1.msi
drwx------+ 4    0 Mar 30 18:13 ./client/source
drwx------+ 4    0 Mar 30 18:07 ./client/source/Installer
-rwx------ 1   1374 Dec 7 15:41 ./client/source/Installer/Installer.sln
-rwx------ 1   8704 Mar 16 12:06 ./client/source/Installer/Installer.suo
drwx------+ 4    0 Mar 30 18:07 ./client/source/Installer/Setup1
drwx------+ 2    0 Mar 30 18:07 ./client/source/Installer/Setup1/Debug
-rwx------ 1 388608 Jan 25 12:54 ./client/source/Installer/Setup1/Debug/Setup1.msi
drwx------+ 2    0 Mar 30 18:07 ./client/source/Installer/Setup1/Release
-rwx------ 1 110592 Mar 19 2003 ./client/source/Installer/Setup1/Release/Setup.Exe
-rwx------ 1    173 Mar 16 11:59 ./client/source/Installer/Setup1/Release/Setup.Ini
-rwx------ 1 387072 Mar 16 11:59 ./client/source/Installer/Setup1/Release/Setup1.msi
-rwx------ 1  32399 Mar 15 09:17 ./client/source/Installer/Setup1/Setup1.vdproj
drwx------+ 4    0 Mar 30 18:07 ./client/source/Installer/WindowsApplication1
-rwx------ 1   1044 Dec 1 11:52
./client/source/Installer/WindowsApplication1/AssemblyInfo.vb
-rwx------ 1   1733 Jan 30 2002
./client/source/Installer/WindowsApplication1/Installer1.resx
-rwx------ 1   3143 Dec 2 13:26
./client/source/Installer/WindowsApplication1/Installer1.vb
-rwx------ 1   4559 Dec 1 12:30
./client/source/Installer/WindowsApplication1/WindowsApplication1.vbproj
-rwx------ 1   1813 Mar 16 12:06
./client/source/Installer/WindowsApplication1/WindowsApplication1.vbproj.user
drwx------+ 2    0 Mar 30 18:07 ./client/source/Installer/WindowsApplication1/bin
-rwx------ 1   7168 Mar 16 11:59
./client/source/Installer/WindowsApplication1/bin/WindowsApplication1.dll
-rwx------ 1  17920 Jan 25 12:54
./client/source/Installer/WindowsApplication1/bin/WindowsApplication1.pdb
drwx------+ 4    0 Mar 30 18:07 ./client/source/Installer/WindowsApplication1/obj
drwx------+ 4    0 Mar 30 18:07
./client/source/Installer/WindowsApplication1/obj/Debug
drwx------+ 2    0 Mar 30 18:07
./client/source/Installer/WindowsApplication1/obj/Debug/TempPE
-rwx------ 1    188 Dec 1 12:01
./client/source/Installer/WindowsApplication1/obj/Debug/WindowsApplication1.Form1.resources
-rwx------ 1   8192 Jan 25 12:54
./client/source/Installer/WindowsApplication1/obj/Debug/WindowsApplication1.dll
-rwx------ 1   8704 Dec 1 12:01
./client/source/Installer/WindowsApplication1/obj/Debug/WindowsApplication1.exe
-rwx------ 1  17920 Jan 25 12:54
./client/source/Installer/WindowsApplication1/obj/Debug/WindowsApplication1.pdb
drwx------+ 2    0 Mar 30 18:07
./client/source/Installer/WindowsApplication1/obj/Debug/temp
drwx------+ 4    0 Mar 30 18:07
./client/source/Installer/WindowsApplication1/obj/Release
drwx------+ 2    0 Mar 30 18:07
./client/source/Installer/WindowsApplication1/obj/Release/TempPE
-rwx------ 1    188 Jan 25 12:55
./client/source/Installer/WindowsApplication1/obj/Release/WindowsApplication1.Installer1.resources
-rwx------ 1   7168 Mar 16 11:59
./client/source/Installer/WindowsApplication1/obj/Release/WindowsApplication1.dll
drwx------+ 2    0 Mar 30 18:07
./client/source/Installer/WindowsApplication1/obj/Release/temp
drwx------+ 3    0 Mar 30 18:07 ./client/source/SmartDeviceApplication1
-rwx------ 1   1108 Jan 5 12:16 ./client/source/SmartDeviceApplication1/Payment Ranger.sln
-rwx------ 1  10240 Mar 16 11:58 ./client/source/SmartDeviceApplication1/Payment Ranger.suo
-rwx------ 1    178 Jan 22 18:24
./client/source/SmartDeviceApplication1/RangerClient.ini
drwx------+ 4    0 Mar 30 18:08
./client/source/SmartDeviceApplication1/SmartDeviceApplication1
```

-continued

```
-rwx------  1    883 Nov 25 14:42
./client/source/SmartDeviceApplication1/SmartDeviceApplication1/AssemblyInfo.vb
-rwx------  1    766 Jan 25 13:53
./client/source/SmartDeviceApplication1/SmartDeviceApplication1/Icon1.ico
-rwx------  1   1173 Jan  5 18:34
./client/source/SmartDeviceApplication1/SmartDeviceApplication1/Logging.vb
-rwx------  1   7936 Mar 16 11:58
./client/source/SmartDeviceApplication1/SmartDeviceApplication1/Ranger.vb
-rwx------  1   8488 Mar 16 11:58
./client/source/SmartDeviceApplication1/SmartDeviceApplication1/RangerClient.vbdproj
-rwx------  1   2128 Mar 16 11:58
./client/source/SmartDeviceApplication1/SmartDeviceApplication1/RangerClient.vbdproj.user
-rwx------  1   1269 Jan 31 04:00
./client/source/SmartDeviceApplication1/SmartDeviceApplication1/RangerResponse.vb
-rwx------  1   1641 Jan 31 03:21
./client/source/SmartDeviceApplication1/SmartDeviceApplication1/TriState.vb
drwx------+ 3      0 Mar 30 18:07
./client/source/SmartDeviceApplication1/SmartDeviceApplication1/cab
drwx------+ 2      0 Mar 30 18:07
./client/source/SmartDeviceApplication1/SmartDeviceApplication1/cab/Debug
-rwx------  1   9309 Jan  5 13:48
./client/source/SmartDeviceApplication1/SmartDeviceApplication1/frmLogin.resx
-rwx------  1   3250 Jan 27 18:28
./client/source/SmartDeviceApplication1/SmartDeviceApplication1/frmLogin.vb
-rwx------  1  11951 Feb  4 09:41
./client/source/SmartDeviceApplication1/SmartDeviceApplication1/frmMain.resx
-rwx------  1   6724 Mar 16 11:58
./client/source/SmartDeviceApplication1/SmartDeviceApplication1/frmMain.vb
-rwx------  1   9855 Jan  6 09:55
./client/source/SmartDeviceApplication1/SmartDeviceApplication1/frmReplace.resx
-rwx------  1   4013 Feb  3 13:36
./client/source/SmartDeviceApplication1/SmartDeviceApplication1/frmReplace.vb
drwx------+ 4      0 Mar 30 18:07
./client/source/SmartDeviceApplication1/SmartDeviceApplication1/obj
drwx------+ 4      0 Mar 30 18:09
./client/source/SmartDeviceApplication1/SmartDeviceApplication1/obj/Debug
drwx------+ 2      0 Mar 30 18:07
./client/source/SmartDeviceApplication1/SmartDeviceApplication1/obj/Debug/TempPE
drwx------+ 2      0 Mar 30 18:07
./client/source/SmartDeviceApplication1/SmartDeviceApplication1/obj/Debug/temp
drwx------+ 4      0 Mar 30 18:09
./client/source/SmartDeviceApplication1/SmartDeviceApplication1/obj/Release
drwx------+ 2      0 Mar 30 18:07
./client/source/SmartDeviceApplication1/SmartDeviceApplication1/obj/Release/TempPE
drwx------+ 2      0 Mar 30 18:07
./client/source/SmartDeviceApplication1/SmartDeviceApplication1/obj/Release/temp
-rwx------  1    271 Dec  1 17:21 ./client/source/SmartDeviceApplication1/setup.ini
drwx------+ 8      0 Mar 30 18:13 ./server
drwx------+ 7      0 Mar 30 18:06 ./server/admin
-rwx------  1   1611 Mar 18 14:39 ./server/admin/a.js.php
-rwx------  1   4718 Feb 26 18:20 ./server/admin/addvehicle.php
-rwx------  1   4579 Mar  9 14:44 ./server/admin/adjustments.php
-rwx------  1   2373 Feb 26 18:20 ./server/admin/car.gif
-rwx------  1   4615 Mar 30 16:21 ./server/admin/coupons.php
-rwx------  1   3832 Mar 16 14:39 ./server/admin/customers.php
-rwx------  1   5048 Feb 28 17:02 ./server/admin/editCustomer.php
-rwx------  1   6946 Mar  6 13:54 ./server/admin/enterInfo.php
-rwx------  1   7459 Mar 29 14:34 ./server/admin/facrebates.php
-rwx------  1   3976 Mar  6 13:54 ./server/admin/finance.php
-rwx------  1   1198 Mar 30 16:21 ./server/admin/footer.php
drwx------+ 2      0 Mar 30 18:06 ./server/admin/forms
-rwx------  1   2034 Mar 29 14:34 ./server/admin/forms/customapr.php
-rwx------  1    686 Mar 16 14:48 ./server/admin/forms/customerbuttons.php
-rwx------  1   1606 Mar 29 14:34 ./server/admin/forms/customerinfo.php
-rwx------  1   2220 Mar 30 16:21 ./server/admin/forms/showcoupons.php
drwx------+ 2      0 Mar 30 18:06 ./server/admin/functions
-rwx------  1    268 Mar  6 14:20 ./server/admin/functions/error.php
-rwx------  1   3242 Mar 11 14:30 ./server/admin/functions/loadDb.php
-rwx------  1    912 Mar 18 14:39 ./server/admin/functions/newfields.php
-rwx------  1   5292 Mar 21 16:02 ./server/admin/functions/updatedb.php
-rwx------  1   1478 Mar 11 14:30 ./server/admin/functions/writeHeader.php
-rwx------  1   2048 Mar 30 16:21 ./server/admin/header.php
drwx------+ 2      0 Mar 30 18:06 ./server/admin/incs
-rwx------  1    229 Mar 22 09:38 ./server/admin/index.php
-rwx------  1   2422 Mar 29 14:34 ./server/admin/menu.php
drwx------+ 2      0 Mar 30 18:06 ./server/admin/nadTools
-rwx------  1   5846 Mar 18 14:39 ./server/admin/new__vehicles.php
-rwx------  1   2760 Mar 11 15:26 ./server/admin/oldCustomers.php
```

-continued

```
-rwx------ 1    4198 Feb 26 18:20 ./server/admin/playingHeader.gif
-rwx------ 1    3865 Mar 29 14:34 ./server/admin/rr_import.php
-rwx------ 1    2213 Feb 26 18:20 ./server/admin/stock_new.php
-rwx------ 1    2305 Feb 26 18:20 ./server/admin/stock_used.php
-rwx------ 1    2614 Mar 30 16:21 ./server/admin/styles.css
-rwx------ 1    1184 Mar 8 18:10 ./server/admin/topmenu.php
drwx------+ 2      0 Mar 30 18:06 ./server/admin/trash
-rwx------ 1    3608 Mar 22 09:38 ./server/admin/usermanager.php
-rwx------ 1    4615 Mar 30 18:06 ./server/admin/v2_coupons. php
-rwx------ 1    7459 Mar 30 18:06 ./server/admin/v2_facrebates.php
-rwx------ 1    5878 Mar 30 18:06 ./server/admin/v2_vehicles.php
-rwx------ 1    3093 Mar 22 09:38 ./server/admin/v3_facrebates.php
-rwx------ 1    5878 Mar 18 16:27 ./server/admin/vehicles.php
-rwx------ 1    3426 Mar 29 14:34 ./server/admin/viewCustomer.php
drwx------+ 2      0 Mar 30 18:06 ./server/doc
-rwx------ 1    3152 Feb 26 18:20 ./server/doc/design.txt
-rwx------ 1 159466 Mar 8 17:40 ./server/doc/ranger.sql
-rwx------ 1    5176 Feb 26 18:20 ./server/emailform.php
drwx------+ 3      0 Mar 30 18:06 ./server/functions
-rwx------ 1    3623 Mar 29 14:34 ./server/functions/access.php
-rwx------ 1    3126 Mar 7 16:00 ./server/functions/aprmath.php
-rwx------ 1    2571 Mar 29 14:34 ./server/functions/cardb.php
-rwx------ 1    9158 Mar 30 17:54 ./server/functions/fni.php
-rwx------ 1    3098 Mar 29 14:34 ./server/functions/rr_import.php
-rwx------ 1    1695 Mar 29 14:34 ./server/functions/save.php
drwx------+ 2      0 Mar 30 18:06 ./server/functions/trash
-rwx------ 1    3779 Mar 21 16:02 ./server/functions/util.php
drwx------+ 2      0 Mar 30 18:06 ./server/images
-rwx------ 1     189 Feb 26 18:20 ./server/images/downArrow.gif
-rwx------ 1    3949 Feb 26 18:20 ./server/images/header-right.jpg
-rwx------ 1   19071 Feb 26 18:20 ./server/images/logo1.gif
-rwx------ 1  433487 Feb 26 18:20 ./server/images/logo1.psd
-rwx------ 1   11282 Feb 26 18:20 ./server/images/playingHeader.png
-rwx------ 1     244 Feb 26 18:20 ./server/images/trash.png
-rwx------ 1     190 Feb 26 18:20 ./server/images/upArrow.gif
-rwx------ 1     481 Mar 21 16:02 ./server/import_fj34r.php
drwx------+ 2      0 Mar 30 18:06 ./server/incs
-rwx------ 1     278 Mar 8 18:13 ./server/incs/auth.php
-rwx------ 1       7 Feb 26 18:20 ./server/incs/blank.html
-rwx------ 1     306 Mar 6 13:54 ./server/incs/common.php
-rwx------ 1     357 Mar 8 17:40 ./server/incs/dbstart.php
-rwx------ 1     403 Feb 26 18:20 ./server/incs/pdaauth.php
-rwx------ 1     502 Feb 26 18:20 ./server/incs/script-GetCarData.php
-rwx------ 1     117 Mar 6 13:54 ./server/incs/status.php
-rwx------ 1      85 Mar 9 14:43 ./server/index.php
-rwx------ 1     511 Mar 11 15:55 ./server/labels.php
-rwx------ 1    1605 Mar 10 11:32 ./server/login.php
-rwx------ 1    4691 Mar 30 18:01 ./server/ls-lR.txt
-rwx------ 1    3491 Mar 30 16:26 ./server/pdaStuff.php
-rwx------ 1   99494 Mar 30 16:21 ./server/ranger.sql
drwx------+ 2      0 Mar 30 18:06 ./server/trash
```

BACKGROUND OF THE INVENTION

This invention pertains to the sale or financing of vehicles at a dealership lot, more specifically, quickly obtaining a reliable estimate of a customer's expected monthly payment obligation or net sales price of a given vehicle taking into account the complexity of available manufacturer or dealer incentives as well as the personal financial factors of a given customer.

PRIOR ART

It is frequently a tedious and difficult process for a customer at an automobile dealership to obtain a reliable estimate of his expected monthly payments for a particular car, truck, or sport utility vehicle while browsing the vehicles that he may see on a dealership's lot. Often there is a multitude of choice involving financing opportunities for that vehicle, including manufacturer's special APR, annual percentage rate, incentives, cash rebate opportunities, cash rebate and low APR incentive split opportunities, private coupons, lease opportunities, balloon payments, dealer arranged bank financing, and the customer's own source bank or credit union financing. Rates and terms may vary according to the year of the vehicle, whether the vehicle is new or used, the amount financed, the term or the loan, the percent of down payment, the manufacturer's incentive programs at that time, whether a used car has been certified by a manufacturer's program, dealership profit goals in the finance department, as well as the customer's own credit rating, along with other factors. It is not infrequent that a customer may face obstacles and time delays even to determine the actual sales price that a dealership is offering a vehicle for sale to the public. In almost any event a salesperson, even one equipped with a pocket calculator, is simply unable to quickly and accurately ascertain a reliable estimate of a particular customer's expected monthly payment obligation for a specific vehicle while taking into account all the above possibilities as well as the customer's own particular credit rating, cash down payment, trade-in allowance and trade-in payoff amount. A system that allows a customer to browse a dealership's inventory and uses a hand held device to quickly recognize the unique vehicle identification number of any vehicle for sale in the dealership's new or used car field and then, after accessing the appropriate applicable data base tables, calculate among all the various alternatives and then choose and display the preferred monthly payment estimate specific for that customer would be of great value to both the customer and the selling dealership. Additional vehicle sales are anticipated at dealerships offering their customers a choice of using this invention because greater customer satisfaction with the shopping process is anticipated at those dealerships, and increased customer satisfaction with the shopping process is typically associated with increased vehicle sales.

REFERENCES CITED

U.S. Pat. No. 6,125,356, granted Sep. 26, 2000, Brockman et al. titled Portable sales presentation system with selective scripted seller prompts refers to the financing of vehicles only as "may include conventional programming enabling the seller to use it as a financial calculator for calculating, e.g., lease payments, loan payments, and the like."

U.S. Pat. No. 5,774,883, granted Jun. 30, 1998, Andersen, et al. titled Method for selecting a seller's most profitable financing program refers to a method of selecting a seller's best profit financial program from a rank ordered, plurality of financial programs, with the goal to sell more cars, generate the greatest possible profit on each sale and guarantee purchase by a lending institution, not to facilitate quick and easy payment estimates for customers.

U.S. Patent application No. 2004/0098324 published May 20, 2004, Chuang et al. titled System and method for providing budgets for vehicle sales using a mobile computing device and the corresponding U.S. Patent application No. 2004/0111345 published Jun. 10, 2004, Chuang et al. titled System and method for assisting in selling vehicles refers to budget as calculating fees relating to vehicles. This invention mentions an installment budget sub-module for the user to select a down payment, a period for making payments, an interest rate, and other budgetary parameters only in passing.

OBJECTS AND ADVANTAGES

Customers who plan to finance their vehicle may browse a dealership lot and see an estimate of their expected monthly payment for each vehicle as they compare.

Customers who plan on paying cash for a vehicle may browse a dealership lot and see the expected net sales amount after all rebates, coupons, discounts, and incentives on each vehicle that they compare.

Customers may easily ascertain the difference in their price or payment for a new introductory year model as compared to a current, or last year's model.

Customers may easily ascertain the difference in their price or payment for a new vehicle as compared to a similar used vehicle.

Customers may easily ascertain the difference in their price or payment for a vehicle with basic trim level compared to a similar vehicle with a higher trim level and more options.

Customers may easily ascertain the difference in their payment if they increase the amount of their down payment, or renegotiate their trade allowance.

Dealerships may make immediate adjustments to the quoted net sales price of each of their vehicles by reflecting changes in factory rebates that occur in the Factory Incentives database table rather than by making the changes at each individual vehicle.

Dealerships may make immediate adjustments to the sales price of any vehicle by making the change in the Vehicle database table.

Dealerships can be more certain that their entire inventory will be correctly quoted at each sales opportunity.

Dealerships may increase the level of customer satisfaction by immediately addressing customer inquiries as to payment or price.

Customers and Dealerships can both recognize overlooked opportunities and take advantage of all available factory incentives to the fullest.

Customers may tend to browse the Dealership's lot more thoroughly, this increasing the chance that they will find a vehicle in their price or payment range that they like.

Dealerships may increase their walk-in business by offering a fun and easy to use shopping tool.

DETAILED DESCRIPTION

In brief, this invention allows a customer to use a handheld device to recognize the vehicle identification number of a vehicle for sale at a dealership's lot. The handheld device then transmits over a wireless local area network the chosen vehicle identification number to a host computer server which accesses each of the hosted database tables necessary for calculating the customer's monthly payment estimate.

Several different methods of calculation, as necessary, are performed using the information in the database tables, and then the results are compared to arrive at the preferred payment estimate, typically the lowest payment estimate. The preferred estimate is then transmitted back to the handheld device for display to the customer.

This system of increasing sales of vehicles at an automobile dealership using a hand held scanner and a data base link provides an easy automatic way for a customer to obtain an estimate of his expected monthly payment obligation for any vehicle for sale on a dealership's sales lot consistent with that customer's own unique cash down payment, trade equity, credit rating, and eligibility for special dealership or manufacturer programs. Such special programs are often based on the customer's place of employment, credit union membership, year, make, and model of their presently owned vehicles, previous or present military service, previous new car buying experience, residency in declared disaster areas, educational level, along with other diverse factors. The customer's cash down payment and trade equity are critical factors in determining the customer's estimated monthly payment obligation, but in most every case the customer's credit rating is also an extremely important variable. This invention takes into account each customer's unique variables as those variables apply to a specific vehicle when performing the payment estimate calculations. This invention provides both a customer with an excellent credit rating as well as a customer with a poor credit rating a monthly payment estimate based on that customer's own unique factors. The system allows a customer to quickly compare among this year's and last year's models, pickup trucks, sport utility vehicles, sedans, and convertibles, new vehicles and used vehicles, to see what his preferred monthly payment estimate will be.

In the currently preferred embodiment of the system, similar to the current working model, the system consists of the following basic devices:

A PDA, personal data assistant, device with an integrated bar code reader and processor is used. The PDA device has WLAN, wireless local area network, capability. The PDA device has an operating system sufficient to process data, store data, transmit and receive data. The PDA device has display screen sufficient to display to the customer this invention's results. The Symbol MC50 model with optional imaging 1-D and 2-D decode capability, IEEE 802.11b WLAN connectivity, 3.5" QGVA transflective color display, an Intel XScale PXA270 processor, Microsoft Windows Mobile 2003 Second edition for pocket pc operating system, with 64 MB RAM/64 MB ROM is adequate for use as a PDA device with this invention, though other PDA devices may also be acceptable.

A computer server, desktop computer, or similar assembled components with available hard drive or other accessible data storage sufficient to store all the desired data tables is used. The computer has sufficient processing speed to quickly look up the selection of required data in the data tables and to then perform the mathematical calculations necessary for quick and accurate results. A personal computer with a 1 GHZ AMD Athlon processor, 512 MB of RAM, a 6 GB hard drive, a network card, and a Windows XP professional operating system with Service Pack 2 is adequate for use as a computer server with this invention, though other computer server arrangements may also be acceptable.

A WLAN or similar private or public network infrastructure sufficient to exchange information between the PDA and the desktop computer is used. A Symbol WS 2000 wireless switch with an array of four 2.4 GHZ omni directional 5 DBI indoor/outdoor antennas is adequate for use with this invention for a dealership of a moderate size with a regular and unobstructed physical layout, though other WLAN arrangements may also be acceptable.

In the preferred embodiment, a second local area network is used, to permit operation of this invention from any other desktop computer within a dealership connected to the second private network system. This allows for multiple uses simultaneously of this invention throughout the car dealership. This second local area network is not required. The Dealerships own local area network may be adequate, although other arrangements for a second local area network may also be acceptable.

Multiple data storage tables are used. Minimum amounts of data may be stored for this invention to operate at a less complex level of functionality. The data storage tables would typically consist of at least a Vehicle data table, APR tables for conventional financing, and a Factory Incentives table, and a Customer data table.

The Vehicle data table would typically consist of at least the VIN, vehicle identification number, or other unique identifying label, a notation of whether the vehicle is new or used, and the dealership selling price of the vehicle. For enhanced capability to customize the use of this invention for adaptability at the dealership, the Vehicle data table would also consist of identifiers indicating if the vehicle was a new dealer demonstrator or a certified used vehicle, the Manufacturer's Suggested Retail Price, MSRP, the invoice price of new vehicles, the current dealer cost figures of both new and used vehicles, the X plan indicated selling price, the A plan indicated selling price, the amount of cash or true customer trade equity required for individuals with very poor credit, the number of days that the vehicle has been in the dealer inventory, the current odometer mileage of the vehicle, the trim level, the vehicle color, wheelbase, as well as other additional details as may be desired with future enhancements.

The APR tables for conventional financing allow the dealership to input the preferred term and annual percentage rate to be used for each individual tier of customer credit rating depending on the year of the vehicle and whether the vehicle is new or used. Typically in the marketplace, older vehicles are financed at a shorter term and a higher interest rate than newer vehicles. Annual percentage rates are typically higher for those individuals with poor credit than for those individuals with excellent credit.

The Factory Incentives table is populated by the dealership with the up to date information of the Manufacturer's rebates and low APR offers, as well as other incentives that may be available to purchasers or lessees of a selected year and model vehicle. Typically the incentives are often a choice of a customer cash offer, or rebate, a factory associated financing offer at a below market interest rate, or a combination of a rebate and a low interest rate offer. Lease incentives are often of a somewhat similar basic structure. Frequently the Factory Incentives may be particular to a specific body type within a vehicle line, for example a different incentive for a coupe instead of a sedan. It is also common for the Factory Incentives to vary with the engine of the vehicle chosen. This invention organizes the data in the Factory Incentives table by select digits of the vehicle identification number. For many manufacturers, the fifth, sixth, and seventh digit represents the car line, series, and body style, or the truck line, series, and body style of the vehicle. The eighth digit is typically the engine code. The tenth digit is the year model of the vehicle. This invention organizes the information in the Factory Incentives table by the year and fifth, sixth, seventh, and sometimes eighth digit of the vehicle identification number, as well as the credit tier level of the individual customer. For example, Factory Incentives for the 2005 Chrysler Town & Country long wheel base models may be referenced by the body codes P44, P54, P64, and P74. It is not important to reference the eighth digit, engine code, in this case because that information does not affect the amount of the offerings of factory incentives. For customers with A credit, excellent credit, the customer has a choice of a $2,500 amount of cash rebate, or customer cash, as one offer. The second choice for a customer with A credit is financing at 0.0% APR for a term of 60 months, which is an offer that is below conventional market rate financing for a customer with A credit, although for a shorter maximum term that a customer with A credit may be offered. A customer with A credit might typically be offered conventional financing for a term of 72 months. The third offer in this case for a customer with A credit is a $2,000 cash rebate plus the advantage of 0.0% APR for a term of sixty months. For a customer with B credit, or good credit, the factory incentive would be limited only to a choice of a $2,500 cash rebate or financing at 0.9% for a term of sixty months. A customer with C credit, or somewhat marginal credit, would in this case be offered a cash rebate opportunity of $2,500 or financing at 4.9% for a term of sixty months. Depending on the current prevailing factory incentives offers, the current prevailing rates and terms for conventional financing, the customer's credit tier, the customer's cash down payment, positive or negative trade-in equity, and the amount of coupons and discounts which all determine the customer's final amount to be financed, any of the various factory incentive offerings may result in the customer's preferred payment estimate, or lowest payment estimate, at one time or another. By making multiple calculations and then comparing the results, this invention determines the preferred payment estimate for each customer while taking into account the many variables that affect each individual customer.

The Customer Data table consists typically of at least the amount of the customer's cash down payment, the customer's trade-in equity, and the customer's credit level tier. Additional prompts that allow this invention to identify special discount or cash coupons that would uniquely apply to a particular customer sub grouping, eligibility for special plan pricing, specifically and particularly named financing rates and terms such as may be available to the customer from his credit union or other outside source financing, and a selection to allow for a net cash price after the applied benefit of all cash rebates and coupons to be displayed rather than a payment range for those customers not interested in financing arrangements are preferred, but not necessary. An option to include an estimate of the titling tax, tag and title fees, processing fee, and other fees in the amount financed for the payment estimate may be included as well, although it is not necessary.

The Dealership Options Data table, if included, would provide for dealership prompts to manipulate data fields in order to allow varying profit levels for each year model and vehicle line. Other options could include offering an exceptionally low price for old age vehicle inventory, or larger discounts for overstocked color or trim lines. It is expected that many other dealership prompts may become useful and desired depending on the needs of the individual dealership. The Dealership Options Data table is preferred, but not necessary.

Although other vehicle identifiers may be used, in the preferred embodiment of this invention the VIN is used to reference the vehicle to the Vehicle Data table as well as throughout the system in referencing data such as that in the Factory Incentives Data table.

To begin use of this invention, a dealership employee would typically input the available customer data for a specific customer present at the dealership's lot into the Customer Data table. A unique digit identifier is then activated for that customer, and the unique identifying digit is entered into the PDA as a log on to begin this invention processes. Because each customer has a unique digit identifier, multiple customers may use multiple PDAs with this invention.

A customer's information may be edited within the Customer Data table. The customer's unique identifying digits are then reactivated for further use of this invention.

Once the customer has selected a vehicle which interests him, he selects "SAVE" on the PDA. Multiple vehicles may be saved for further review by both the customer and the dealership staff. Once the customer has finished browsing, he selects "DONE" on the PDA. The customer input data as well as the mathematical calculations that were used to obtain the preferred payment estimate on each vehicle are then available for review by the customer and the dealership staff.

The customer uses the PDA to scan the bar code label affixed to the vehicle. Many or most new vehicle manufacturers place a bar code, which includes the vehicle identification number, VIN, on the Manufacturer's Suggested Retail Price, MSRP, label which is required on every new vehicle to be sold within the United States. Manufacturers sometimes bar code the VIN in other locations on the vehicle as well. General Motors places a bar code on the VIN plate by the driver's A pillar on the vehicle. Dealerships often place a bar code label themselves on their vehicles to aid in inventory control. It is anticipated in cases when a readable bar code containing a vehicle's VIN is not readily available on a vehicle, that a dealership using this invention will affix a bar code label to each vehicle on the dealership's lot. A bar code label which stacks three PDF13 bar codes one upon the other is adequate for this invention, although other labels may also be acceptable. The stacking of three PDF13 labels allows for excellent readability in varying light conditions, as well as good ease of use for the individual operating the PDA device. A Zebra bar code printer using weather resistant self adhesive paper and a weather resistant ink ribbon is adequate for this invention, although other printers, labels, and ink may be acceptable. Other identifiers other than the VIN may be used within this invention, but for avoiding expected possible problems of mislabeling vehicles and to take best advantage of some of this invention's features the use of the VIN is highly recommended.

The PDA device scans the bar code of the chosen vehicle. The PDA transmits the VIN to the Computer Server over the WLAN. If the Computer Server finds the VIN of the chosen vehicle in the Vehicle Data Table, several different mathematical calculations are then typically performed and results compared one to another to deduce the result which results in the preferred monthly payment amount.

If the vehicle is labeled as used, then Selling Price is determined by any applying any adjustments as may be noted in the Dealer Options Data Table to the List Price, and then applying the positive or negative subtotal of the customer's cash down payment and trade-in equity to arrive at an amount to be financed. The annual percentage rate and term of the financing is found in the APR Data tables for used vehicles referenced by the customer's credit rating tier. The mathematical calculations are then performed to arrive at a monthly payment result. In the case of a vehicle labeled as used, that monthly payment result is then multiplied by 101%, and then both the monthly payment result and 101% of the monthly payment result are rounded upwards to the nearest whole dollar. The payment range that has been calculated, as well as the vehicle identification number, is then transmitted to the PDA for display to the customer. For example: Payment Range, 310-314, 1FASP65L4SK113753.

If the vehicle is labeled as certified used, then the Selling Price is determined by any applying any adjustments as may be noted in the Dealer Options Data Table to the List Price, and then applying the positive or negative subtotal of the customer's cash down payment and trade-in equity to arrive at an amount to be financed. The annual percentage rate and term of the financing is found in the APR Data tables for used vehicles referenced by the customer's credit rating tier. The mathematical calculations are then performed to arrive at a monthly payment result. After determining the amount to be financed, the annual percentage rate and term of the financing is found in the APR Data tables for certified used vehicles referenced by the customer's credit rating tier. Some manufacturer's certified used vehicle programs establish distinct annual percentage rates and terms depending on the model of the vehicle. In the case of such existing programs, the Dealer Options Data table would include, by body code, the interest rate or term adjustments available for those certified used vehicles. Then a second set of mathematical calculations are performed to arrive at a monthly payment result. The monthly payment result from each of these two methods is then compared, and the lower result is selected. That monthly payment result is then multiplied by 101%, and then both the monthly payment result and 101% of the monthly payment result are rounded upwards to the nearest whole dollar. The payment range that has been calculated, as well as the vehicle identification number, is then transmitted to the PDA for display to the customer.

Many manufacturers offer the customer a choice of incentive programs when purchasing a new vehicle. Typically, these offers vary by the year of the vehicle as well as the model, body type, and vehicle engine. Typically the customer may often choose from a stand alone cash rebate, also called customer cash, or from a stand alone low interest rate offer, or from a combination incentive which may include a smaller cash rebate offer than the stand alone cash rebate offer as well as a low interest rate offer that is not quite as low as the stand alone low interest offer. The low interest rate offerings in all the incentives typically vary somewhat with the customer's credit tier. Depending on the amount of cash down payment, net trade equity, discounts, coupons, and any other reductions in the final amount to be financed on the vehicle as well as importantly the specifics of the low interest rate offers compared to other financing alternatives as determined by the customer's credit tier, any of the several alternatives of manufacturer incentives may result in lower or preferred payment estimate at a given time.

If the vehicle is labeled as new, then the Selling Price is determined by any applying any adjustments as may be noted in the Dealer Options Data Table to the List Price, and then applying the positive or negative subtotal of the customer's cash down payment and trade-in equity to arrive at an amount to be financed. The amount financed is then further adjusted by applying the dollar amount of any dealer cash programs, if any, that are to be applied to the customer's purchase price. The amount financed is then reduced by the amount of any special cash coupons to which the customer may be entitled, such as military, college, or other association or group associations. From this further subtotal of the amount to be financed, the eligible cash rebate from the Factory Incentives data table is then applied, and the payment estimate is calculated using the applicable information from the APR data tables. From the earlier subtotal, the payment estimate is again calculated, this time using the applicable information from the Factory Incentives data table of the stand alone low APR financing. From the earlier subtotal, the payment estimate is again calculated using the applicable information from the Factory Incentives data table of the combination offer of a cash rebate and low APR financing. The three results are compared, and the preferred result, typically the lowest payment estimate, is then ranged upwards one percent and then rounded up to the nearest whole dollar amounts. The preferred result is then transmitted to the PDA device for display to the customer.

When lease estimates are also desired, the method used is to perform the same type of multiple calculations to determine the preferred result for display to the customer.

An additional embodiment to this invention would entail placing an RFID, radio frequency identification device, tag with the VIN and other pertinent information in or on the vehicle rather than the use of a bar code label. This would allow scanning easily in extremely inclement weather conditions, such as when the vehicle was covered by a layer of ice or snow.

An additional embodiment to this invention would entail using Optical Character Recognition to recognize the VIN of the vehicle rather than a bar code. This would allow for the recognition perhaps of any vehicle from the VIN plate near the driver's A pillar of a vehicle without any additional labeling by the dealership being necessary.

An additional embodiment to this invention would entail using the PDA device to contain the data tables and also to process the calculations. This would allow for the elimination of the WLAN.

An additional embodiment to this invention would allow for calculations to be made as a customer browses a dealership's inventory on a computer at the dealership or from the customer's home by way of the internet. This would allow for additional information to be available to the customer before he arrives at the dealership's lot.

An additional embodiment to this invention would allow its use at other dealerships than motor vehicle dealerships, such as recreational vehicle dealerships, motorcycle dealerships, boat dealerships, and airplane dealerships.

An additional embodiment to this invention would allow for the use of this invention in other fields of commerce, such as in real estate. An RFID tag placed near a house for sale could contain the specific sales price, property tax data, and special financing offers. Based upon the customer's credit, financing eligibility, and down payment amount, as well as other factors, the customer's approximate monthly payment estimate including principal, interest, taxes, insurance, and private mortgage insurance could be arrived at for the customer to consider. It is anticipated that many diverse applications of this invention will become obvious as diverse fields of commerce are considered.

An additional embodiment to this invention would display for the customer all calculation choices, not just the preferred choice, and/or display a full financial disclosure at the time of each payment estimate.

In general, the means and method for increasing sales of vehicles at an automobile dealership using a handheld scanner and a database link may take other forms from that which has been thus far described. While some of the expected alternative embodiments have been described, those familiar with the art to which this invention relates will recognize various alternative designs and embodiments for practicing the invention. These alternative embodiments are within the scope of the present invention. The scope of the present invention is defined by the claims and the allowable equivalents.

What is claimed is:

1. A method providing one or more customers browsing a dealership car lot using wireless handheld devices, an immediate, automatic, and preferred payment estimate or net sale price for one or more vehicles for sale, the method for each customer using a wireless handheld device comprising:

recognizing a vehicle identification number of a vehicle for sale by the dealership by the wireless hand held device;

transmitting over a wireless network the vehicle identification number by the wireless handheld device to a computer server, the computer server preloaded with vehicle data associated with the vehicle identification number, financing data, factory incentives data, dealership financial data and the customer data, wherein the computer server calculates a preferred payment estimate or net price for the vehicle using the vehicle identification number and the preloaded data, and wherein factory incentives are determined based on the vehicle year, credit tier of the customer and at least the fifth, sixth and seventh digits of the vehicle identification number;

transmitting the payment estimate or net price for the vehicle to the wireless handheld device and displaying to the customer;

saving the payment estimate or net price for the vehicle by the customer in the handheld device, wherein the method may be repeated to save the payment estimate or net price for each vehicle identification number recognized;

terminating by the customer use of the handheld device for browsing by selecting a termination condition recognized by the handheld device; and revealing subsequent to the termination condition saved payment estimate or net price for one or more recognized vehicles to both the customer and dealership staff.

2. The method of claim 1, wherein the wireless handheld device recognizes the vehicle identification number of the vehicle for sale by scanning a bar code containing the vehicle identification number.

3. The method of claim 2, wherein the wireless handheld device is a personal digital assistant device.

4. The method of claim 3, wherein the personal digital assistant device comprises an integrated bar code scanner.

5. The method of claim 1, wherein the wireless handheld device recognizes the vehicle identification number of the vehicle for sale by reading a radio frequency identification device containing the vehicle identification number.

6. The method of claim 1, wherein the wireless handheld device recognizes the vehicle identification number of the vehicle for sale by using optical character recognition.

7. The method of claim 1, wherein the wireless handheld device used to recognize a vehicle identification number is a personal digital assistant device.

8. The method of claim 7, wherein the personal digital assistant device comprises an integrated bar code scanner that recognizes the vehicle identification number.

9. The method of claim 1, wherein the preferred payment estimate is determined by comparing a first set of calculations with at least a second set of calculations.

10. The method of claim 9, wherein the comparing determines a lowest monthly payment.

11. A system providing one or more customers browsing a dealership car lot using wireless handheld devices with an immediate, automatic, and preferred payment estimate or net sale price for one or more vehicles for sale, the system comprising:
   a wireless handheld device recognizing the vehicle identification number of the vehicle for sale by the dealership, wherein the device transmits the recognized vehicle identification number, and receives and displays a preferred payment estimate or net price for each vehicle identification number recognized, wherein the device provides a save function activated by the customer for one or more preferred payment estimates or net prices displayed, wherein the device provides a termination function activated by the customer, and wherein subsequent to the termination the saved preferred payment estimate or net price for one or more recognized vehicles are revealed to both the customer and dealership staff;
   a computer server calculating a preferred payment estimate or net price for each recognized vehicle identification number received by a wireless handheld device, wherein the computer server uses preloaded data, the preloaded data organized in database tables comprising vehicle data associated with the vehicle identification number, financing data, factory incentives data, dealership financial data, and customer data, wherein factory incentives are determined based on the vehicle year, credit tier of the customer and at least the fifth, sixth and seventh digits of the vehicle identification number, and wherein the preferred payment estimate or net price for the vehicle is transmitted with the vehicle identification number to the wireless handheld device transmitting the vehicle identification number; and
   a wireless network connecting one or more wireless handheld devices to the computer server.

12. The system of claim 11, wherein the wireless handheld device recognizes the vehicle identification number of the vehicle for sale by scanning a bar code containing the vehicle identification number.

13. The system of claim 12, wherein the wireless handheld device is a personal digital assistant device.

14. The system of claim 13, wherein the personal digital assistant device comprises an integrated bar code scanner.

15. The system of claim 11, wherein the wireless handheld device recognizes the vehicle identification number of the vehicle for sale by reading a radio frequency identification device containing the vehicle identification number.

16. The system of claim 11, wherein the wireless handheld device recognizes the vehicle identification number of the vehicle for sale by using optical character recognition.

17. The system of claim 11, wherein the wireless handheld device used to recognize a vehicle identification number is a personal digital assistant device.

18. The system of claim 17, wherein the personal digital assistant device comprises an integrated bar code scanner that recognizes the vehicle identification number.

19. The system of claim 11, wherein the preferred payment estimate is determined by comparing a first set of calculations with at least a second set of calculations.

20. The system of claim 19, wherein the comparing determines a lowest monthly payment.

21. A method providing one or more customers browsing a dealership car lot using personal digital assistant devices, an immediate, automatic, and preferred payment estimate or net sale price for one or more vehicles for sale, the method for each customer using a personal digital assistant device comprising:
   recognizing a vehicle identification number of a vehicle for sale by the dealership by the personal digital assistant device;
   calculating a preferred payment or net price by the personal digital assistant device, the personal digital assistant device preloaded with vehicle data associated with the vehicle identification number, financing data, factory incentives data, dealership financial data and the customer data, wherein the personal digital assistant device calculates a preferred payment estimate or net price for the vehicle using the vehicle identification number and the preloaded data, and wherein factory incentives are determined based on the vehicle year, credit tier of the customer and at least the fifth, sixth and seventh digits of the vehicle identification number;
   displaying the preferred payment or net price to the customer;
   saving the payment estimate or net price for the vehicle by the customer in the personal digital assistant device, wherein the method may be repeated to save the payment estimate or net price for each vehicle identification number recognized;
   terminating by the customer use of the personal digital assistant device for browsing by selecting a termination condition recognized by the personal digital assistant device; and
   revealing subsequent to the termination condition saved payment estimate or net price for one or more recognized vehicles to both the customer and dealership staff.

22. The method of claim 21, wherein the personal digital assistant device recognizes the vehicle identification number of the vehicle for sale by scanning a bar code containing the vehicle identification number.

23. The method of claim 22, wherein the personal digital assistant device comprises an integrated bar code scanner.

24. The method of claim 21, wherein the personal digital assistant device recognizes the vehicle identification number of the vehicle for sale by reading a radio frequency identification device containing the vehicle identification number.

25. The method of claim 21, wherein the personal digital assistant device recognizes the vehicle identification number of the vehicle for sale by using optical character recognition.

26. The method of claim 21, wherein the preferred payment estimate is determined by comparing a first set of calculations with at least a second set of calculations.

27. The method of claim 21, wherein the comparing determines a lowest monthly payment.

28. A personal digital assistant device providing one or more customers browsing a dealership car lot using the handheld device with an immediate, automatic, and preferred payment estimate or net sale price for one or more vehicles for sale, the personal digital assistant device comprising:

bar code scanner recognizing the vehicle identification number of the vehicle for sale by the dealership;

memory storing preloaded data organized in database tables comprising vehicle data associated with the vehicle identification number, financing data, factory incentives data, dealership financial data, and customer data;

a processor calculating a preferred payment estimate or net price for each recognized vehicle identification number, wherein the processor uses the preloaded data to calculate the preferred payment estimate or net price for the vehicle, wherein calculating factory incentives based on the preloaded data are based on the vehicle year, credit tier of the customer and at least the fifth, sixth and seventh digits of the vehicle identification number, and wherein the preferred payment estimate or net price for the vehicle is displayed with the vehicle identification number by the personal digital assistant device; and a display screen displaying the preferred payment estimate or net price for each vehicle identification number recognized, wherein the personal digital assistant device provides a save function activated by the customer saving one or more preferred payment estimates or net prices displayed, wherein the personal digital assistant device provides a termination function activated by the customer, and wherein subsequent to the termination the saved preferred payment estimate or net price for one or more recognized vehicles are revealed to both the customer and dealership staff.

29. The device of claim 28, wherein the personal digital assistant device recognizes the vehicle identification number of the vehicle for sale by scanning a bar code containing the vehicle identification number.

30. The device of claim 28, wherein the personal digital assistant device recognizes the vehicle identification number of the vehicle for sale by reading a radio frequency identification device containing the vehicle identification number.

31. The device of claim 28, wherein the personal digital assistant device recognizes the vehicle identification number of the vehicle for sale by using optical character recognition.

32. The device of claim 28, wherein the preferred payment estimate is determined by comparing a first set of calculations with at least a second set of calculations.

33. The device of claim 32, wherein the comparing determines a lowest monthly payment.

* * * * *